US010945330B2

(12) United States Patent
Keller

(10) Patent No.: US 10,945,330 B2
(45) Date of Patent: Mar. 9, 2021

(54) PLASMA SPRAYING DEVICE

(71) Applicant: AMT AG, Doettingen (CH)

(72) Inventor: Silvano Keller, Boettstein (CH)

(73) Assignee: OERLIKON METCO AG, Wohlen AG (CH)

( * ) Notice: Subject to any disclaimer, the term of this patent is extended or adjusted under 35 U.S.C. 154(b) by 195 days.

(21) Appl. No.: 16/095,994

(22) PCT Filed: Aug. 21, 2017

(86) PCT No.: PCT/CH2017/000075
§ 371 (c)(1),
(2) Date: Oct. 24, 2018

(87) PCT Pub. No.: WO2018/035619
PCT Pub. Date: Mar. 1, 2018

(65) Prior Publication Data

US 2019/0141828 A1 May 9, 2019

(30) Foreign Application Priority Data

Aug. 26, 2016 (CH) ...................................... 1092/16

(51) Int. Cl.
*B23K 10/00* (2006.01)
*H05H 1/34* (2006.01)
*H05H 1/42* (2006.01)
*H05H 1/28* (2006.01)

(52) U.S. Cl.
CPC ................ *H05H 1/34* (2013.01); *H05H 1/28* (2013.01); *H05H 1/42* (2013.01); *H05H 2001/3452* (2013.01); *H05H 2001/3478* (2013.01)

(58) Field of Classification Search
CPC .. H05H 1/34; H05H 1/28; H05H 1/42; H05H 2001/3452; H05H 2001/3478
See application file for complete search history.

(56) References Cited

U.S. PATENT DOCUMENTS 5,332,885 A * 7/1994 Landes .................... H05H 1/34 219/121.47
5,406,046 A * 4/1995 Landes .................... H05H 1/34 219/121.47
5,944,901 A * 8/1999 Landes .................... H05H 1/34 118/723 ER
6,114,649 A * 9/2000 Delcea ..................... H05H 1/34 119/75
7,030,336 B1 * 4/2006 Hawley .................... H05H 1/34 219/121.49
2014/0326703 A1 * 11/2014 Molz ....................... C23C 4/134 219/121.47

FOREIGN PATENT DOCUMENTS

EP 0 289 961 A2 9/1988
EP 1 875 785 B1 1/2008

* cited by examiner

*Primary Examiner* — Mark H Paschall
(74) *Attorney, Agent, or Firm* — Maginot, Moore & Beck, LLP

(57) ABSTRACT

A plasma spraying device includes a torch head which has a plasma channel that extends between a cathode and an anode. The plasma channel is bounded by a plurality of neutrodes which are electrically insulated from each other. A gap extends between the frontmost neutrode and the anode, which gap is divided into at least two sections. There is a radial distance and an axial distance between the two sections. An insulating disk is arranged in each of the two sections.

20 Claims, 2 Drawing Sheets

PLASMA SPRAYING DEVICE

PRIORITY CLAIM

This application is a 35 U.S.C. 371 National Stage application of PCT/CH2017/000075, filed Aug. 21, 2017, and claims priority to Swiss Application No. CH 01092/16 filed on Aug. 26, 2016. The entire contents of the above-mentioned patent applications are incorporated herein by reference as part of the disclosure of this U.S. application.

BACKGROUND

The invention relates to a plasma spraying device, an anode and a neutrode for a generic plasma spraying device.

Plasma spraying devices are known from the state of the art, the torch head of which has a cathode, an anode spaced apart therefrom as well as an intermediate neutrode arrangement which comprises a number of neutrodes insulated against each other. The anode is, as is normal, designed in the form of a round nozzle. When in operation an arc is generated between the cathode and the anode. The arc in this case is present in the area on the input side, i.e. in the area facing the inside of the torch head. In this area the temperatures are very high possibly reaching 10'000 Kelvin and more. Therefore, apart from the anode, other parts bounding the anode, in particular the adjoining neutrode, are thermally highly stressed and exposed to high wear.

A generic plasma spraying device is known from the EP 500 492 A1. Its torch head is provided with a cathode arrangement, an annular anode and a number of electrically insulated neutrodes. A gap exists between individual neutrodes, into which annular discs from an insulating material are inserted. These neutrodes form a plasma channel which is provided with a constriction. The inner diameter of the annular discs corresponds to the inner diameter of the plasma channel. In order to cool the anode and the neutrodes, a cooling channel (cavity) is arranged on the outside thereof, which has cooling water flowing through it. The frontmost of these annular discs, which is arranged between the frontmost neutrode and the anode, is, together with the frontmost neutrode, exposed to high thermal stress and therefore subject to high wear, in particular because the anode and also the frontmost neutrode are being cooled by cooling water only on the outside.

The EP 1 875 785 A1 discloses an interface for a plasma cannon. This comprises, among others, a holder on the plasma cannon for a nozzle attachment. The plasma channel is formed by a plurality of neutrodes together with the nozzle attachment. To this end both the nozzle attachment and the neutrodes are provided with cylindrical bores. The nozzle attachment is fixed by means of a clamping arrangement on the plasma cannon. Cooling of the clamping arrangement as well as of the nozzle attachment is accomplished in that a channel for cooling liquid leads from the plasma cannon initially through the clamping arrangement and thereafter through the nozzle attachment. From the nozzle attachment the channel leads along the outside of the neutrodes back to the plasma cannon. A sealing ring, which on the inside radially reaches as far as an insert of the nozzle, is arranged between the frontmost neutrode and the nozzle. An O-ring is arranged external to this sealing ring.

Finally, the EP 0 289 961 A2 has disclosed a plasma torch called an arcing device with adjustable cathode. The plasma torch is made up of three modules, namely a pistol body group, a nozzle group provided with an anode and a cathode group. The cathode group comprises a rod-shaped cathode which is connected to an axially movable piston. By means of this piston the cathode can be moved forward or backward in axial direction. The pistol body group comprises four pipe-shaped segments. The frontmost of these segments adjoins the anode. There is a gap between the frontmost segment and the anode in which an insulating ring is arranged.

SUMMARY OF THE DISCLOSURE

It is the objective of the invention to propose a plasma spraying device, where the thermally highly stressed parts of the torch head, in particular the anode together with the adjoining neutrode, are configured such that for the same nominal power they have a longer service life or that they permit increased nominal power for the same service life.

The fact that the gap extending between the frontmost neutrode and the anode is in at least two sections with a radial and/or axial distance existing between the two sections and with an insulating disc being arranged in each of the two sections, provides the basic prerequisite that the point of wear in the thermally most stressed area of the plasma spraying device, in particular the anode together with the adjoining neutrode, has a longer service life for the same nominal power or permits an increased nominal power for the same length of service life.

In comparison to conventional plasma spraying devices in which the gap between the frontmost neutrode and the anode extends predominantly linearly and is provided with only one insulating disc, a long-time stable electrical insulation is ensured between the frontmost neutrode and the anode due to the features cited according to the invention. By dividing the gap into different sections and by providing a radial and/or axial distance between the two sections each provided with an insulating disc, the stress on in particular the second or outer insulating disc, i.e. the insulating disc facing away from the plasma channel, is comparatively small. In addition, hydraulic sealing is improved in that it is not possible for any cooling liquid to penetrate via the said channel into the plasma channel since the seal provided for sealing the gap is exposed to less thermal stress.

In a preferred further development it is proposed that said gap comprises a first inner section, a second middle section and a third outer section, wherein the first section is offset relative to the third section in radial and axial direction and wherein an insulating disc is arranged in both the first and the third section. Due to such an offset the third section can be re-arranged in a thermally less stressed area. In addition, the middle section acts as a thermal insulator.

Especially preferably the middle section of the gap extends at an angle to the inner and/or outer section. This measure causes an even better thermal shielding of the outer section.

A further preferred design provides that a sealing ring is arranged radially outside the outer section. Such a sealing ring is thus arranged in an area which is thermally stressed to a less high degree.

With such a further preferred further development of the plasma spraying device the frontmost neutrode is provided with a ring-shaped projection facing the anode, and the anode is provided with a ring-shaped indentation facing the frontmost neutrode, wherein the gap extends between the said projection and the said indentation. Due to these features the gap divided into several sections can be comparatively easily realised.

Preferably the inner section is arranged in radial direction within the outer section, wherein an insulating disc is arranged in the inner section which relative to the plasma channel is set back in radial direction. As a result the said insulating disc is somewhat spaced apart from the arc present when in operation, and the outer section is particularly well thermally shielded.

A preferred further development provides that the inner diameter of the frontmost neutrode, at least in the end region facing the anode, is larger by at least 10%, in particular by at least 20%, preferably by at least 30% than the inner diameter of the anode. This design makes sure that the arc does not start as early as at the frontmost neutrode, but only later when it reaches the anode. This design also contributes to the temperature, in the area of the gap between the frontmost neutrode and the anode, being comparatively low, with no discernible burn-off being created at the frontmost neutrode, which ultimately contributes to an increased service life of in particular the frontmost neutrode.

With a preferred further development the anode is shaped as a ring and provided on the inside with a high-melting point insert, which in direction of the longitudinal axis of the plasma channel at least approximately reaches as far as the gap between the frontmost neutrode and the anode. With this type of design the point at which the arc starts may be moved into the area of the gap.

Especially preferably the frontmost neutrode is provided with a ring-shaped collar, in which slots are formed for forming cooling ribs. Such cooling ribs have a large surface so that the neutrode can be very efficiently cooled by means of a cooling liquid.

Especially preferably all neutrodes are provided with a ring-shaped collar, wherein each collar is provided with a plurality of axial slots, so that a plurality of cooling ribs are formed, and wherein the cooling ribs formed in this way are connected to a channel or annular space, in which a coolant circulates. Due to this design all neutrodes can be efficiently cooled.

Especially preferably the said slots have a depth, which is at least 5% of the circumference of the collar, especially preferably at least 10% of the circumference of the collar. Slots formed in this way form cooling ribs with a particularly large surface, which in view of a good cooling effect of the associated neutrode is advantageous.

The fact that the respective slot substantially extends across the entire axial length of the respective neutrode as specified in a preferred further development, ensures that the cooling effect on the corresponding neutrode is particularly good.

Preferably the plasma spraying device has an annular space completely surrounding the neutrodes for receiving the cooling liquid. An annular space of this kind ensures that the neutrodes can be cooled along their entire circumference.

Especially preferably the annular space is arranged and shaped in such a way that the cooling liquid flows in axial direction along both the neutrodes and the anode. Due to an axial flow of the cooling liquid a particularly good heat dissipation can be achieved.

With a further advantageous further development of the plasma spraying device the first neutrode facing the cathode is provided with a conically tapering section forming part of the plasma channel. As a result a kind of constriction is formed by means of which the flow of the plasma jet can be influenced in the desired manner.

DESCRIPTION OF THE DRAWINGS

A preferred exemplary embodiment of the invention will now be described in detail with reference to drawings, in which.

DETAILED DESCRIPTION

Since generic plasma spraying devices are known, the focus hereunder is in particular on the features and elements which are essential in the context of the invention.

Figure 1:
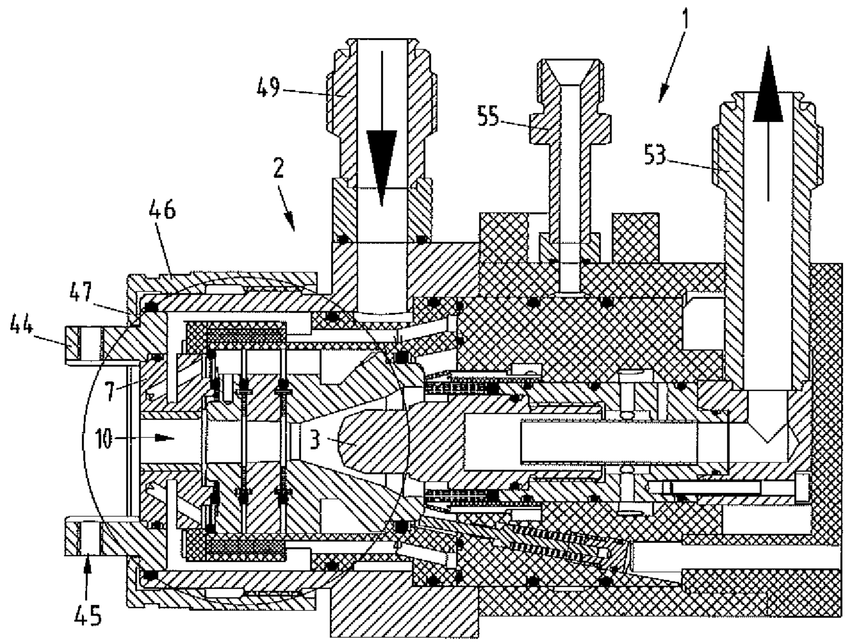
FIG. 1 shows a longitudinal section through the torch head of the plasma spraying device.
Figure 1A:
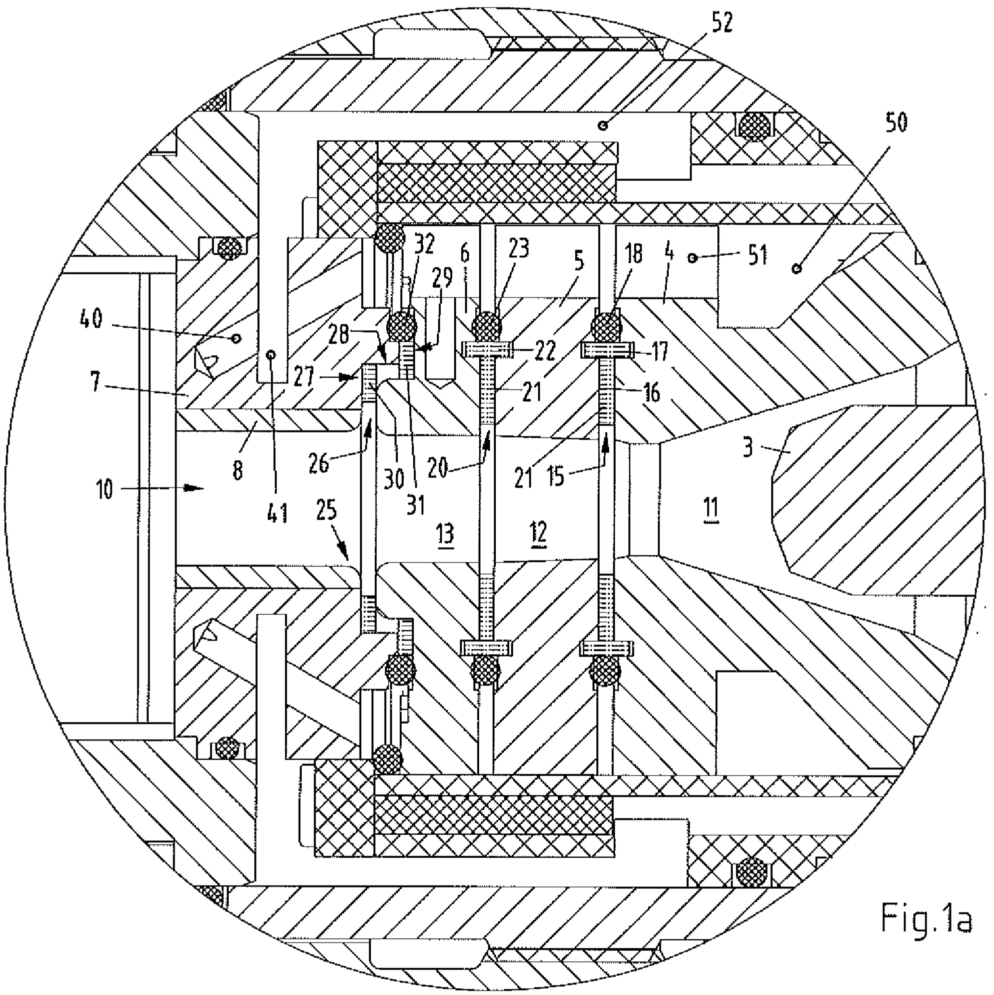
FIG. 1*a* shows an enlarged section from FIG. 1.

FIG. 1 shows a longitudinal section through the torch head 2 of the plasma spraying device marked overall with 1, while FIG. 1*a* shows an enlarged cut-out from FIG. 1. The design of a plasma spraying device/the associated torch head 2 constructed according to the invention will now be explained in detail with reference to FIGS. 1 and 1*a*.

The torch head 2 comprises a cathode 3, an anode 7 spaced apart therefrom and a neutrode arrangement arranged in between and consisting of three neutrodes 4, 5, 6. The neutrodes 4, 5, 6 together with the essentially hollow-cylindrically shaped anode 7 form the plasma channel 10. At the outlet-side end the anode 7 comprises a powder supply element 44 which is provided with radially extending channels 45, via which the coating powder can be supplied. The anode 7 together with the three neutrodes 4, 5, 6 is fixed by means of a cap nut 46, the clamping lug 47 of which presses on the anode 7 in the area of the powder supply element 44. The anode 7 in turn axially presses on the neutrodes 4, 5, 6 and fixes the same also in axial direction.

The first or rearmost neutrode 4 comprises an inner space 11 with a section 11*a* conically narrowing towards the front in flow direction. This conical section 11*a* forms part of the plasma channel 10. Due to this conical section 11*a* a constriction is formed by means of which the flow of the plasma jet is influenced in the desired manner.

The first neutrode 4 surrounds the rod-shaped cathode 3. The middle neutrode 5 is essentially ring-shaped, wherein its inner space 12 slightly widens in direction of the anode 7. The last or frontmost neutrode 6 has an essentially cylindrical inner space 13. An annular gap 15, 20 exists between both the rearmost 4 and the middle neutrode 5 and between the middle 5 and the frontmost neutrode 6. These two gaps 15, 20 extend essentially radially linearly outwards. An annular insulating disc 16, 21 each is inserted into the said two gaps 15, 20. The respective insulating disc 16, 21 is formed relatively thinly and is bounded on the outside by a flat but equally annular supporting ring 17, 22. This outer supporting ring 17, 22 is followed by an O-ring 18, 23 respectively, which serves as seal for the cooling liquid, as will be explained hereunder in more detail.

There also exists a gap 26 between the frontmost neutrode 6 and the anode 7. This gap 26 however does not extend linearly, but consists of a first inner section 27 extending essentially radially, a second middle section 28 extending essentially axially and a third outer section 29 extending again essentially radially. The first inner section 27 is both radially and axially offset relative to the third outer section 29. The middle section 28 extends essentially at an angle of 90° to the first and third sections 27, 29. Naturally any other angles of e.g. 30°, 45° or 60° are possible.

An insulating disc 30, 31 each is received in the inner as well as in the outer section 27, 29. The two insulating discs 30, 31 are spaced apart and the in-between part of the middle section 28 functions as a thermal insulator. The outer insulating disc 31 is followed again by an O-ring 32 which serves as a seal for the cooling liquid and at the same time creates a gas-tight seal. The three insulating discs 16, 21, 30 are set slightly back relative to the plasma channel 10 which has a positive impact on their service life. The inner insulating disc 31 arranged in the third gap 26 is set back even further than the two other insulating discs 16, 21, to the extent that their inside extends outside the insert 8.

The essentially hollow-cylindrical anode 7 is on the inside provided with an insert 8, which consists of a high-melting-point conductive material such as for example tungsten.

The cooling liquid serving to cool the elements of the torch head is introduced via a front connecting flange 49 into the torch head 2. From this connecting flange 49 oblique channels not recognisable in the views shown in FIGS. 1 and 1*a* lead into the first annular space 50. The annular space 50 leads into a second flow space 51 also shaped as an annular space which extends around the three neutrodes 4, 5, 6 and serves to cool the same. At the end the flow space 51 leads into an oblique channel 40 formed in the anode 7, which extends as far as into the region of the front end of the anode 7. The oblique channel 40 crosses an annular channel 41 formed in the anode 7, from where the cooling liquid can flow upwards into a further return space 52 formed as a further annular space, which is connected, via several channels (not shown) inside the torch head, to a rearward connecting flange 53. This rearward connecting flange 53 is the point, where the cooling liquid exits the torch head. A further central connecting flange 55 is provided via which the torch can be supplied with a gas.

The said O-rings 18, 23, 32 prevent the cooling liquid from flowing from the flow space 51 via the respective gap 15, 20, 26 into the plasma channel 10. The insulating discs 16, 21, 30, 31 in particular are used for electrical but also thermal insulation. The insulating discs 16, 21, 30, 31 are manufactured from a non-conducting and high-temperature-resistant material such as silicon nitride. Moreover, the insulating discs 16, 21, 30, 31 protect the O-rings 18, 23, 32 consisting of an elastic and temperature-resistant material such as Viton® against excessive thermal stress.

When the plasma spraying device is in operation, an electric arc is present between the cathode 3 and the anode 7. This arc extends from the cathode 3 into the starting region 25 of anode 7 or insert 8. In this starting region 25 the insert 8 is preferably rounded off which is advantageous in view of a long service life. The arc usually wanders around a bit in this starting region 25. At any rate, the starting region 25 of the anode 7 and thus also the region around the adjacent insulating disc 27 is the most stressed region of the plasma spraying device. Due to the specific design of the gap 26 between the frontmost neutrode 6 and the anode 7 as well as of the two insulating discs 30, 31 arranged in this gap 26, this problem is accounted for in a particular manner, and also the O-ring 32 arranged in the frontmost gap 26 is thermally particularly well shielded. The middle section 28 of the third gap 26 functions as a thermal insulator between the two insulating discs 30, 31. Moreover the inner insulating disc 30 is set back somewhat relative to the inside of the anode 7/the anode insert 8, which has a positive influence upon their service life. At the same time the three neutrodes 5, 6, 7 as well as the anode 7 are efficiently cooled, as will now be explained in detail. At any rate, experiments with such a torch head 2 have shown that even if the inner insulating disc 30 is omitted or fails or burns down, the O-ring 32 remains hydraulically tight over a period of several hundred up to more than a thousand hours thus ensuring a reliable function and preventing any penetration of coolant into the plasma channel 10. In this context it should be mentioned that during operation penetration of the coolant into the plasma channel 10 would be equivalent to a destruction of the torch head.

The three neutrodes 4, 5, 6 are provided with a ring-shaped circumferential collar (not recognisable). Each of these collars has a plurality of axially extending recesses or slots moulded therein for forming cooling ribs. The cooling liquid flows from the annular space 50 into the flow space 51 formed as an annular space and flows through the same. The flow space 51 is arranged and designed such that the cooling liquid can flow in axial direction along the neutrodes 4, 5, 6 and also along the anode 7. The cooling liquid also flows in axial direction through the axial slots in the neutrodes 4, 5, 6, which serve to form cooling ribs. Since neutrodes 4, 5, 6 are provided with axially extending slots, the cooling liquid can circulate in longitudinal direction along the neutrodes and ensure efficient cooling. After the frontmost neutrode 6 the cooling liquid flows via the obliquely extending bores 40 of the anode 7 into the annular channel 41 of the anode 7. Behind the annular channel 41 the obliquely extending bores 40 extend still further to the front into the basic body of the anode 7. From the annular channel 41 the cooling liquid enters further above into the return space 52 surrounding the neutrode arrangement, from where it then flows upwards into the rearward connecting flange 53 via which it can exit from the torch head 2. It is also possible to reverse the through-flow direction of the cooling water. Moreover, the inner diameter of the flow space 51 is preferably adapted to suit the outer diameter of the circumferential collar of the respective neutrode 4, 5, 6 such that the neutrodes 4, 5, 6 when inserted into the flow space 51 are accurately aligned in radial direction.

Figure 2:
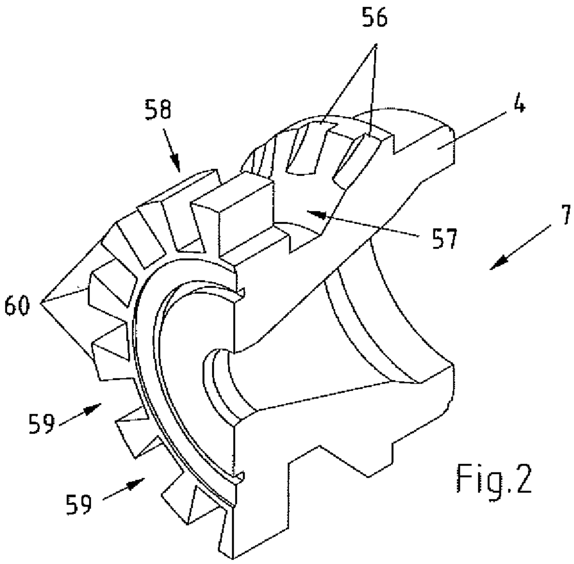
FIG. 2 shows the first neutrode in a perspective and cutaway view.

FIG. 2 shows the first neutrode 4 in a perspective and cut-away view. In the entry-side region this neutrode 4 is provided on the outside with axially obliquely extending indentations 56 in the shape of slots, via which the cooling liquid can enter into an annular channel 57 surrounding the neutrode 4. The annular channel 57 is bounded on the front side facing the second neutrode by a ring-shaped circumferential collar 58. This collar 58 is provided with axially extending recesses in the shape of slots 59, so that a plurality of cooling ribs 60 is forms. A collar 58 designed in this manner has a large surface with a corresponding large cooling surface and permits good cooling of the first neutrode. The respective slot 59 preferably comprises a depth, which is at least 5% of the collar circumference, especially preferably at least 10% of the collar circumference. The first neutrode 4 on the inside facing the cathode, is provided with a conically tapering section forming part of the plasma channel.

Figure 3:
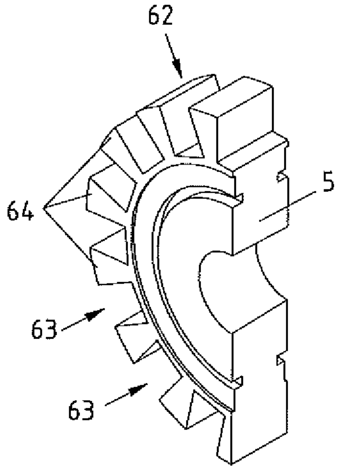
FIG. 3 shows the second neutrode in a perspective and cutaway view.

FIG. 3 shows the second neutrode 5 in a perspective and cut-away view. The second neutrode 5 in turn comprises a ring-shaped circumferential collar 62 which has slots 63 formed in it. The cooling ribs 64 formed in this way again permit good cooling of the second neutrode 5. Here as well the slots 63 preferably have a depth which corresponds to at least 5% of the collar circumference, especially preferably at least 10% of the circumference of respective collar.

Figure 4A:
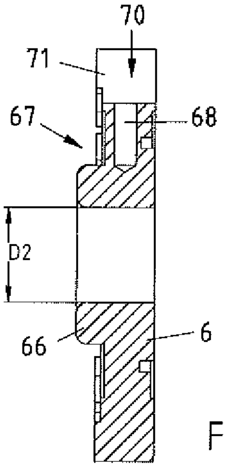
FIG. 4*a* shows a section through the third neutrode.
Figure 4B:
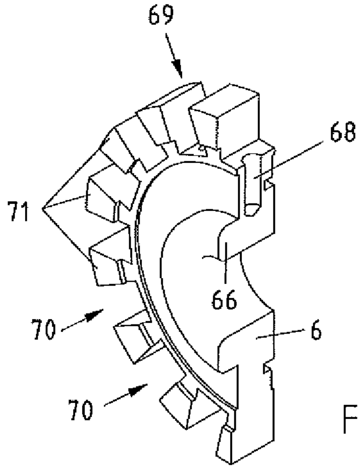
FIG. 4*b* shows the third neutrode in a perspective and cutaway view.

FIG. 4*a* shows a section through the third or frontmost neutrode 6, whilst FIG. 4*b* shows the third neutrode 6 in a perspective and cutaway view. The frontmost neutrode 6, on the front side facing the anode, is provided with a ring-shaped circumferential projection, on the back of which an indentation has been formed. The ring-shaped circumferential projection 66 together with the indentation 67 forms part of the third gap (FIG. 2), in which the outer insulating disc 31 (FIG. 2) is received. The third neutrode 6 as well is provided with a ring-shaped circumferential collar 69 which has slots 70 formed into it. Moreover bores 68 extend from the floor of the respective slot 70 further into the inside of the basic body of the neutrode 6. These bores 68 enlarge the cooling surface of this thermally most stressed neutrode 6 and permit particularly efficient cooling of this neutrode 6. On the inside the projection 66 is preferably shaped rounded-off because in operation the arc is very close to this region. The respective slot 70 preferably again comprises a depth which is at least 5% of the circumference of the collar 69, especially preferably is at least 10% of the circumference of the collar 69. The inner diameter marked D2 of the neutrode 6 approximately corresponds to the inner diameter of the anode, as explained in detail further below.

In the present example fifteen slots have been formed in the collar of the respective neutrode 4, 5, 6, wherein this number can of course vary. Preferably however, at least eight slots are provided. Naturally shape and size of the slots can also vary, wherein of course the number from neutrode to neutrode may be different. The term “insulating disc” also is representative of any kind of insulators which do not necessarily have to be disc-shaped.

Figure 5:
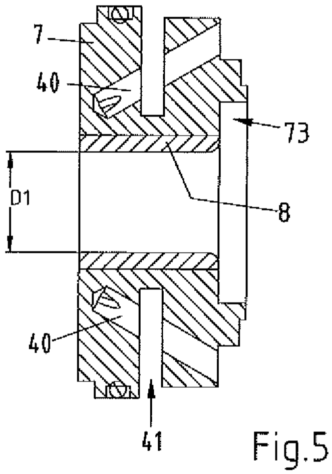
FIG. 5 shows a section through the anode.

Finally, FIG. 5 shows a section through the anode 7. The anode, on its back facing the third neutrode 6, is provided with a ring-shaped indentation 73 into which the projection 66 of the third neutrode 6 can extend. As can be recognised in the FIG. 2, the inner and middle sections 27, 28 of the gap 26 between the anode 7 and the third neutrode 6 are formed between the said projection of the third neutrode 6 and the ring-shaped indentation 73 of the anode 7. Based on the combination of the projection 66 arranged on the third neutrode 6 together with the ring-shaped indentation of the anode 7 a multi-stage gap is formed with simple features and in a cost-effective manner, which in combination with the insulating discs has the above-described advantages. In this exemplary embodiment the inner diameter D1 of the insert 8 of anode 7 corresponds roughly to the inner diameter D2 (FIG. 4*a*) of the adjacent neutrode 6. However, other embodiments are also provided, as will be explained below with reference to FIGS. 6 and 7. The anode 7 is provided with axially extending extensions 43, which extend in radial direction outside the plasma channel 10. These extensions 43 contain the power supply channels 45 for supplying the coating powder. Although in the present example two powder supply channels 45 have been drawn, three or four powder supply channels may be provided. Or alternatively only a single powder supply channel may be provided.

In the view according to FIG. 5 two obliquely extending bores 40 of anode 7 are visible, which lead into the annular channel 41. In total at least ten such bores 40 are provided in the anode 7. In addition, it can be seen that the obliquely extending bores 40 extend beyond the annular channel 41 into the basic body of anode 7 and thus enlarge the cooling surface of anode 7.

One point to be noted at this point is that the three neutrodes 4, 5, 6 as well as the anode 7 are wear parts which after the plasma spraying device has been in use for a certain period of time, are or must be replaced. At the same time the O-rings as well as the insulating discs are normally replaced.

Figure 6:
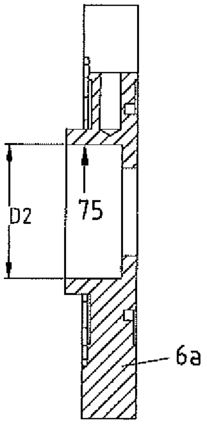
FIG. 6 shows a first alternative embodiment of the third neutrode.

FIG. 6 shows a section through a first alternative design of the third or frontmost neutrode 6*a*. On the inside this neutrode 6*a* is provided with a recess 75, so that its inner diameter D3 increases towards the anode. Due to this recess the inner diameter D3 is enlarged to a diameter D2, which is larger than the inner diameter D1 (FIG. 5) of the adjacent anode, and thus also the insert of the anode. Due to this design it shall be ensured that the arc does not start as early as at this frontmost neutrode 6*a*, but later at the anode. This design also contributes to the fact that the temperature in the region of the third gap 26 (FIG. 1*a*) is comparatively low, and no burn-off sets in at the frontmost neutrode 6*a*, which ultimately contributes to a prolonged service life of in particular the frontmost neutrode 6*a*. Preferably the inner diameter of this third neutrode 6*a* in the region adjacent to the anode is larger by at least 10%, particularly at least 20%, especially preferably at least 30% than that of the anode. If starting, for example, with an inner diameter of the anode of 10 millimetres, the inner diameter of this third neutrode 6*a* in the region adjacent to the anode is larger by at least 1 millimetre, in particular by at least 2, especially preferably by at least 3 millimetres than that of the anode. Another variant could consist in that the inner diameter of the third neutrode is altogether larger than that of the anode.

Figure 7:
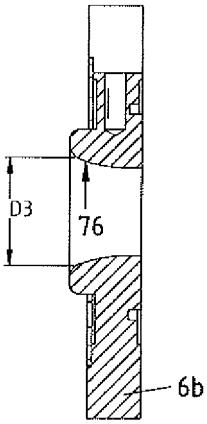
FIG. 7 shows a second alternative embodiment of the third neutrode.

FIG. 7 shows a section through the second alternative design of the third or frontmost neutrode 6*b*. The inner diameter of this neutrode 6*b* continually widens towards the front, so that the inner diameter D3 in the outlet region facing the anode is larger by at least 10%, in particular by at least 20%, especially preferably by at least 30% than the inner diameter D1 of the anode 7 (FIG. 5). Due to this design it shall again be ensured that the arc does not start as early as at the frontmost neutrode 6*b*, but later at the anode. As revealed in FIG. 7 the inner diameter D3 of this frontmost neutrode 6*b* enlarges in that this is provided with a rounding-off on the outlet side. Instead of a rounding-off, a chamfer or a conical shape or a chamfer or conical shape in combination with a rounding-off may be provided.

Figure 8:
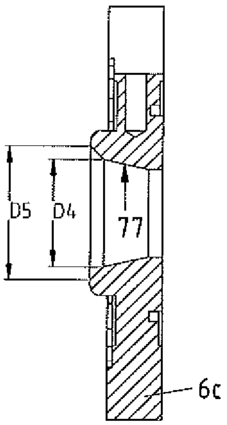
FIG. 8 shows a third alternative embodiment of the third neutrode.

Finally, FIG. 8 shows a section through a third alternative design of the third or frontmost neutrode 6*c*. The inner diameter of this neutrode 6*c* widens towards the front through two conical sections. The first conical section preferably encloses an acute angle, whilst the second conical section encloses an acute or obtuse angle. Preferably the first conical section encloses an angle between approx. 20° and 30°, whilst the second conical section encloses an angle between approx. 80° and 100°. The first conical section, at its outlet-side end, comprises a diameter D4, which is larger by at least 10% than the inner diameter D1 of the anode 7 (FIG. 5), whilst the second conical section is larger by at least 20%, in particular by at least 30%, than the inner diameter D1 of the anode. This design again is to ensure that the arc starts at the anode, and not as early as at the frontmost neutrode 6*c*.

In conclusion it is stated that using the plasma spraying device configured according to the invention, the wear parts in the thermally most stressed area of the plasma spraying device, in particular the anode 7 together with the adjacent neutrode 6, allow a longer service life for the same power rating or allow an increased power rating for the same service life. This is achieved in particular in that the gap 26 between the frontmost neutrode 6 and the anode 7 comprises at least two sections 27, 29, wherein a radial and/or axial distance exists between the sections 27, 29 and wherein an insulating disc 30, 31 is arranged in each section 27, 29. Compared to known plasma spraying devices, the said features, in particular also in combination with the features ensuring an efficient cooling of the frontmost neutrode and the anode, allow for a longer service life of the wear parts/for an increased power rating for the same service life. The material used for the cathode is preferably tungsten or a composite based on tungsten such as W/Cu. The material used for the anode is preferably $THO_2$ (thorium dioxide), whilst the neutrodes preferably consist of copper or a copper alloy.

There now follows a summary once more of some of the advantages of the plasma spraying device configured according to the invention:

- Long-time stable electrical insulation between the frontmost neutrode and the adjacent anode;
- Reliable, long-time stable hydraulic sealing of the gap between the frontmost neutrode and the adjacent anode;
- Particularly efficient cooling of the neutrodes, in particular also of the frontmost neutrode;
- Efficient cooling of the anode;
- Long service life of the anode as well as of the neutrodes;
- Very stable electric arc;
- Compared to generic plasma spraying devices a higher power rating can be achieved for a comparable service life of the wear parts;
- Compared to generic plasma spraying devices a longer service life of the wear parts can be achieved for a comparable power rating;
- The torch head is of simple construction and the wear parts can be replaced simply and quickly;
- The torch head can be manufactured in a cost-effective manner;
- The torch head has a high degree of efficiency in relation to the electrical energy supplied.

It is understood that the above embodiment shows merely a possible or preferred design of the plasma spraying device/the torch head 2 and that designs deviating from this embodiment are perfectly possible. As such two, four or more neutrodes may be used instead of three. The design of the gap between the neutrodes/the frontmost neutrode and the anode may also deviate from the embodiment shown. The gap 26 between the frontmost neutrode 6 and the anode 7 could include further stages in that for example the frontmost neutrode comprises two projections and the anode is provided with two corresponding indentations. Also the described said gap between the frontmost neutrode and the anode could be formed alternatively by providing the anode with a ring-shaped projection facing the frontmost neutrode and by forming the frontmost neutrode correspondingly with a ring-shaped indentation facing the anode. Instead of an anode 7 with moulded-on powder supply element 44 the powder supply element could be designed as a separate component.

The invention claimed is:

1. A plasma spraying device with a plasma channel extending between at least one cathode and an anode and a plurality of neutrodes bounding the plasma channel, wherein the neutrodes are electrically insulated against each other and wherein a gap extends between the frontmost neutrode and the anode, with an insulating disc arranged in the gap, characterised in that the gap between the frontmost neutrode and the anode comprises at least two sections, wherein a radial and/or axial distance exists between the at least two sections and wherein an insulating disc is arranged in each of the at least two sections.

2. The plasma spraying device according to claim 1, characterised in that said gap comprises a first inner section, a second middle section and a third outer section, wherein the first section is offset in radial and axial direction relative to the third section and wherein an insulating disc is arranged in the first and third sections respectively.

3. The plasma spraying device according to claim 2, characterised in that the middle section of the gap extends at an angle to the inner and/or outer section.

4. The plasma spraying device according to claim 1, characterised in that a sealing ring is arranged radially outside an outermost one of said at least two sections.

5. The plasma spraying device according to claim 1, characterised in that the frontmost neutrode is provided with a ring-shaped projection facing the anode and the anode is provided with a ring-shaped indentation facing the frontmost neutrode, and wherein the gap extends between said projection and said indentation.

6. The plasma spraying device according to claim 1, characterised in that an inner section of the at least two sections is arranged within an outer section of the at least two sections in radial direction, wherein an insulating disc is arranged in the inner section, which is set back relative to the plasma channel in radial direction.

7. The plasma spraying device according to claim 1, characterised in that an inner diameter of the frontmost neutrode, at least in an end region facing the anode, is larger than an inner diameter of the anode by at least 10%.

8. The plasma spraying device according to claim 1, characterised in that the anode is ring-shaped and is provided with a high-melting-point insert on the inside, which in a direction of the longitudinal axis of the plasma channel reaches at least as far as the gap between the frontmost neutrode and the anode.

9. The plasma spraying device according to claim 1, characterised in that the frontmost neutrode is provided with a ring-shaped collar, in which slots are formed for forming cooling ribs.

10. The plasma spraying device according to claim 1, characterised in that each of said neutrodes is provided with a ring-shaped collar, wherein each collar is provided with a plurality of axial slots, so that a plurality of cooling ribs are formed, and wherein the thus formed cooling ribs are connected to a channel or annular space in which a coolant circulates.

11. The plasma spraying device according to claim 10, characterised in that the respective slot comprises a depth, which is at least 5% of the circumference of the respective collar.

12. The plasma spraying device according to claim 9, characterised in that the respective slot substantially extends along the entire axial length of the respective neutrode.

13. The plasma spraying device according to claim 1, characterised in that the plasma spraying device comprises an annular space completely surrounding the neutrodes for receiving a cooling liquid.

14. The plasma spraying device according to claim 13, characterised in that the annular space is arranged and formed such that the cooling liquid flows in axial direction along the neutrodes as well as along the anode.

15. The plasma spraying device according to claim 1, characterised in that the first neutrode facing the cathode is provided with a conically tapering section which forms part of the plasma channel.

16. An anode for a plasma spraying device, which is provided with a plasma channel extending between at least one cathode and an anode and a plurality of neutrodes bounding the plasma channel, wherein the neutrodes are electrically insulated against each other, and wherein a gap having at least two sections extends between the frontmost neutrode and the anode, and wherein an insulating disc is arranged in each of the at least two sections, characterised in that the anode is provided with a ring-shaped elevation or a ring-shaped indentation on its back facing the frontmost neutrode for forming the gap having at least two sections.

17. The anode according to claim 16, characterised in that the anode is provided with an annular channel for introducing a coolant, wherein a plurality of oblique channels lead into the annular channel for supplying and discharging the coolant.

18. A neutrode for a plasma spraying device, which is provided with a plasma channel extending between at least one cathode and an anode, and a neutrode adjacent to the anode which forms part of a neutrode arrangement, wherein a gap comprising at least two sections extends between this frontmost neutrode and the anode, and wherein an insulating disc is arranged in each of the at least two sections, characterised in that the neutrode is provided with a ring-shaped projection or a ring-shaped indentation on the front facing the anode for forming the gap comprising at least two sections.

19. The neutrode according to claim 18, characterised in that the inner diameter of the neutrode, at least in the end region facing the anode, is larger by at least 10% than the inner diameter of the anode.

20. The neutrode according to claim 18 characterised in that the neutrode comprises a ring-shaped collar, in which at least eight, in particular at least twelve axial slots are formed, wherein the respective slot comprises a depth, which corresponds to at least 5% of the circumference of the collar.

* * * * *